(12) United States Patent
Wagner

(10) Patent No.: US 10,661,847 B2
(45) Date of Patent: May 26, 2020

(54) TRACK WHEEL SUSPENSION FOR A CONSTRUCTION MACHINE

(71) Applicant: GUANGXI LIUGONG MACHINERY CO., LTD., Liuzhou, Guangxi (CN)

(72) Inventor: Edward Wagner, Guangxi (CN)

(73) Assignee: Guangxi LiuGong Machinery Co., Ltd., Liuzhou, Guangxi (CN)

( * ) Notice: Subject to any disclaimer, the term of this patent is extended or adjusted under 35 U.S.C. 154(b) by 142 days.

(21) Appl. No.: 15/805,083

(22) Filed: Nov. 6, 2017

(65) Prior Publication Data

US 2018/0178865 A1    Jun. 28, 2018

(30) Foreign Application Priority Data

Dec. 23, 2016 (WO) ................ PCT/CN2016/111659

(51) Int. Cl.
    *B62D 55/104*      (2006.01)
    *B62D 55/108*      (2006.01)
    *E02F 9/02*      (2006.01)

(52) U.S. Cl.
    CPC ....... *B62D 55/104* (2013.01); *B62D 55/1083* (2013.01); *B62D 55/1086* (2013.01); *E02F 9/02* (2013.01)

(58) Field of Classification Search
    CPC .............. B62D 55/104; B62D 55/1083; B62D 55/1086; B62D 55/125; B62D 55/108
    See application file for complete search history.

(56) References Cited

U.S. PATENT DOCUMENTS

| 3,047,283 A | 7/1962 | Kivell | |
| 3,161,420 A | * 12/1964 | Rix | ........................... F16F 1/44 |
| | | | 267/258 |
| 3,207,562 A | * 9/1965 | Ewing | ...................... B60F 1/00 |
| | | | 105/215.1 |

(Continued)

FOREIGN PATENT DOCUMENTS

| CN | 101200889 A | 6/2008 |
| CN | 101244562 A | 8/2008 |

(Continued)

OTHER PUBLICATIONS

CN 101445030 English translation (Year: 2009).*

(Continued)

*Primary Examiner* — Jacob D Knutson
*Assistant Examiner* — Harold Eric Pahlck, III
(74) *Attorney, Agent, or Firm* — Young Basile Hanlon & MacFarlane, P.C.

(57) ABSTRACT

A track wheel suspension for a construction machine is introduced. The track wheel suspension includes a track wheel engageable to a track and a swing device including a first coupling portion. The first coupling portion is arranged for rotatably supporting the track wheel. Furthermore, the track 5 wheel suspension including a swing bar with a first bar end which is arranged for being mounted to a second coupling portion of the swing device. The swing bar provides a swing axis which is offset from a rotation axis of the track wheel such that a swing movement of the swing device enables a movement of the track wheel in a direction which is substantially perpendicular to the rotation axis.

20 Claims, 7 Drawing Sheets

(56) References Cited

U.S. PATENT DOCUMENTS

| | | | | |
|---|---|---|---|---|
| 3,246,405 | A * | 4/1966 | Reynolds | B62D 49/04 |
| | | | | 172/136 |
| 4,172,591 | A * | 10/1979 | Craig | B60G 11/20 |
| | | | | 267/154 |
| 4,325,443 | A * | 4/1982 | Fischer | B62D 55/08 |
| | | | | 180/22 |
| 4,809,803 | A * | 3/1989 | Ahern | B60G 11/23 |
| | | | | 180/65.245 |
| 4,863,148 | A * | 9/1989 | Hufnagel | B60G 11/187 |
| | | | | 267/278 |
| 6,062,661 | A | 5/2000 | Juncker et al. | |
| 6,260,465 | B1 * | 7/2001 | Zonak | B62D 55/10 |
| | | | | 305/120 |
| 7,967,087 | B2 * | 6/2011 | Arulraja | B62D 55/108 |
| | | | | 180/9.46 |
| 8,998,239 | B2 * | 4/2015 | Vlahakis | B66C 23/80 |
| | | | | 280/400 |
| 2009/0321152 | A1 | 12/2009 | Arulraja et al. | |
| 2011/0259657 | A1 * | 10/2011 | Fuechtner | B60K 6/52 |
| | | | | 180/65.21 |
| 2012/0012407 | A1 | 1/2012 | Daniels et al. | |
| 2017/0233017 | A1 * | 8/2017 | Kuhn | B62D 55/06 |
| | | | | 180/9.5 |

FOREIGN PATENT DOCUMENTS

| | | | | |
|---|---|---|---|---|
| CN | 101445030 | * | 6/2009 | B60G 17/20 |
| CN | 101445030 | A | 6/2009 | |
| CN | 102729811 | A | 10/2012 | |
| CN | 204095948 | U | 1/2015 | |
| CN | 204898483 | U | 12/2015 | |
| CN | 205116244 | U | 3/2016 | |

OTHER PUBLICATIONS

State Intellectual Property Office of the P.R. China; PCT Written Opinion of the International Searching Authority, Issued in Connection to PCT/CN2016/111659; dated Sep. 21, 2017; 4 pages; China.

State Intellectual Property Office of the P.R. China; PCT International Search Report, Issued in Connection to PCT/CN2016/111659; dated Sep. 21, 2017; 5 pages; China.

Extended European Search Report in corresponding European Patent Application No. 17203818.4, dated Jun. 21, 2018.

* cited by examiner

TRACK WHEEL SUSPENSION FOR A CONSTRUCTION MACHINE

This application claims the benefit, and priority benefit, of International Patent Application No. PCT/CN2016/111659, filed Dec. 23, 2016, which designated the United States and was entitled "TRACK WHEEL SUSPENSION FOR A CONSTRUCTION MACHINE," the disclosure and contents of which are incorporated by reference herein in its entirety.

TECHNICAL FIELD

The technical field relates to a track wheel suspension for a construction machine. In addition, the technical field relates to a construction machine comprising a track wheel suspension.

BACKGROUND

Construction machines like compact track loaders are widely used in the market. Such construction machines may use track drives. Known construction machines with such track drives usually comprise a tracked chassis with rigid or suspended undercarriages. Such configurations are, however, complex and expensive.

Accordingly, it is desirable to at least address the foregoing. In addition, other desirable features and characteristics will become apparent from the subsequent summary and detailed description, and the appended claims, taken in conjunction with the accompanying drawings and this background.

SUMMARY

It is the object of the invention to provide an improved track wheel suspension as well as to provide a construction machine with an improved track wheel suspension.

Described in a first embodiment is a track wheel suspension for a construction machine. The track wheel suspension comprises a track wheel engageable to a track and a swing device comprising a first coupling portion. The first coupling portion is arranged for rotatably supporting the track wheel. Furthermore, the track wheel suspension comprises a swing bar with a first bar end which is arranged for being mounted to a second coupling portion of the swing device. The swing bar provides a swing axis which is offset from a rotation axis of the track wheel such that a swing movement of the swing device enables a movement of the track wheel in a direction which is substantially perpendicular to the rotation axis.

The construction machine can be any suitable type of construction machine. Preferably, the construction machine is a compact track loader, skid-steer loader or a bulldozer. In the context of the present invention, track wheels can be any wheels engaging or contacting a track of the construction machine. For example, a track wheel may be embodied as a drive wheel, a roller or an idler. The drive wheel can comprise a sprocket or sprocket segments for an engagement with the track. The track may comprise multiple track shoes coupled with each other to a continuous track.

The swing device rotatably supports the track wheel in such a manner that the track wheel is movable substantially perpendicular with respect to its own rotation axis in a swinging manner. The swing axis about which the track wheel is swingingly movable is offset from the rotation axis meaning that a movement of the track wheel perpendicular to the rotation axis will occur about the swing axis and with a fixed distance to the swing axis. The swing device may by any suitable link which is able to transmit a force in any direction. For that purpose, the swing device needs to be sufficiently rigid in order to transmit forces. The swing device may be embodied in different configurations as a part or component having solely the function of transmitting forces for supporting the track wheel. In this case, the swing device can be configured as a link, e.g. a bar or rod. The swing device may also be realized as a component having additional functions besides the force transmission for supporting the track wheel. For example, the swing device can be embodied by other components of the construction machine like a housing of a drive means for driving the track wheel. In other words, other components can have the additional function of the swing device thereby combining multiple functions in a single component. For example, the housing of the drive means can be constructed load bearing.

The track wheel can be coupled to the swing device by means of a first coupling portion of the swing device. The first coupling portion is configured to rotatably support the track wheel. Accordingly, the track wheel is rotatably held by the first coupling portion. The first coupling portion may be embodied as a suitable bearing. Furthermore, the first coupling portion can be configured to support the track wheel from opposite sides or from only one side. In this connection, the swing device may be configured in a fork like manner in order that the swing device may accommodate or support the track wheel between its prongs.

The swing device further comprises a second coupling portion. The second coupling portion is coupled to a swing bar at a first bar end. The swing bar preferably comprises a non-circular outer periphery and may be embodied as a torsion bar or a substantially rigid bar. Furthermore, the swing bar may be at least partially solid. The second coupling is preferably configured to non-rotatably couple the swing device to the swing bar. In other words, the swing device can be coupled to the swing bar such that a torque or rotational force can be transferred from the swing device to the swing bar and vice versa. In this way, a rotation of the swing bar may lead to a rotation of the swing device and vice versa. The second coupling can be adapted to be coupled to the swing bar by a positive fit connection or an integral connection achieved by bonding or welding, for instance.

The swing bar provides a swing axis about which the swing device is rotatable. The track wheel is supported rotatable on the swing device such that the rotation axis of the track wheel is offset and preferably parallel to the swing axis. In this way, the track wheel is movable about the swing axis and any translatory movement of the track wheel will occur in a direction substantially perpendicular to the rotation axis. In this way, the track wheel can be moved on a circular path about the swing axis.

According to a further embodiment, the track wheel is a drive track wheel. Accordingly, in the preferred embodiment, the track is driven by means of a drive track wheel which is supported in the track wheel suspension such that it can perform a swing movement about the swing axis. For this, the drive track wheel is configured to force transmittingly engage the track. For example, the drive track wheel can comprise a sprocket or sprocket segments for an engagement with the track. As already mentioned above, the track may comprise multiple track shoes coupled with each other to a continuous track.

Preferably, the track wheel is a leading or a trailing track wheel of multiple track wheels of a construction machine. Thus, in a preferable embodiment, the driving force may be transferred to the track on a trailing side of an undercarriage.

According to a further embodiment of the present invention, the track wheel suspension comprises a direct drive for driving the track wheel. In the context of the present invention, direct drive can be understood as a drive mechanism in which a rotational force or the rotation of the drive track wheel is generated close to or at the drive track wheel. In other words, power for driving the direct drive is at least partially transmitted non-rotatably to the direct drive, hydraulically or electrically for instance.

For example, the direct drive according to the invention can be a hydraulic motor which may be coupled to a multi-stage planetary gear set inside a wheel hub of the drive track wheel. That is, pressurized fluid is guided into such a direct drive and there, hydraulic pressure is converted into torque and an angular displacement. In this way, a rotational force can be generated directly in the drive track wheel.

According to a further preferable embodiment of the present invention, the track wheel suspension comprises a wheel hub drive mounted to the track wheel.

According to a further preferable embodiment of the present invention, the swing device comprises a housing of the direct drive. Accordingly, the housing may be a part of the swing device. In the context of the present invention, the housing may provide or may comprise the second coupling portion for coupling the same to the first bar end of the swing bar. The first bar end is coupled to the housing. This can be realized in such a manner that the rotation axis of the drive track wheel and the swing axis of the swing bar are offset with respect to each other. The first bar end of the swing bar can be coupled to the housing with a positive fit connection. For example, the first bar end may be screwed to the housing using bolts. Preferably, the first bar end comprises a non-round outer periphery and for example a square like cross section. The second coupling portion may provide or comprise a recess in which the first bar end can be accommodated. In this way, a positive fit connection for transmitting torque from the swing bar to the housing is achieved. Other connections between the swing bar and the housing could be used as long as a sufficient torque transfer is possible.

According to a further embodiment of the present invention, the track wheel suspension may comprise a swing limiting device for restricting a swing movement of the swing device. Different configurations for such a swing limiting device are possible. The swing limiting device is configured to limit the path along which the track wheel can move about the swing axis. Accordingly, the swing limiting device can be any suitable means for influencing or limiting the movement of the track wheel. The swing limiting device can be configured to limit the swing movement in one or both directions. Furthermore, the swing liming device can be configured to permanently or temporarily limit the swing movement in at least one swing direction. Different configurations are possible here. For example, the swing limiting device can comprise a configuration in which a movement beyond a specific amount or point is always prevented. In addition to that, there may be a dynamic limiting of the swing movement depending on certain conditions like the travel speed of the construction machine. Thus, the swing limiting device may be controllable and may even be feedback controlled.

In a preferable embodiment of the present invention, the swing limiting device comprises an abutment portion provided on the first coupling portion, for example on the housing of the direct drive, and being arranged for abutting a contact portion provided on said construction machine. Accordingly, the swing movement may be limited by a stop provided on the construction machine. With this configuration, a swing movement in one direction is possible until the abutment portion gets in contact with the contact portion.

According to a preferable embodiment of the present invention, the abutment portion is arranged opposite to the second coupling portion with respect to the rotation axis. In other words, the abutment portion and the second coupling portion are arranged on opposite sides of the rotation axis. The abutment portion, the rotation axis and the second coupling portion can be arranged on a virtual line which is preferably perpendicular to the rotation axis and the swing axis.

According to a preferable embodiment of the present invention, the track wheel suspension further comprises a swing bar housing arranged for accommodating and rotatably supporting the swing bar, wherein at least one elastic element is placed between an outer bar surface of the swing bar and an inner housing surface of the swing bar housing. The elastic element may be a rubber cord or strand arranged along the swing bar and between the swing bar and the inner housing surface. Thus, when the swing bar is rotated with respect to the swing bar housing, the elastic element is elastically deformed. In this way, a spring system is achieved by which a track wheel can be suspended.

According to a preferable embodiment of the present invention, the swing bar and the at least one elastic element are encapsulated in the swing bar housing, wherein preferably a seal is provided for sealing a space between an end portion of the swing bar housing and the swing bar.

The swing bar may comprise two or more peripheral surface sections. For example, the swing bar can comprise three, four or five surface sections. Furthermore, the track wheel suspension may further comprise a number of elastic elements corresponding to the number of surface sections and each of which being located between a respective peripheral surface section and the inner housing surface. According to a preferable embodiment, the swing bar comprises four peripheral surface sections and four elastic elements.

For example, the swing bar as well as the swing bar housing can comprise a square shape. However, different shapes could be used instead. A maximum diameter of the swing bar, that is the distance between two diagonally opposite edges, is smaller than the distance between two inner housing surfaces of the swing bar housing which face each other. The surface sections may be arranged inclined to inner housing surfaces at an angle of preferably about 45°. In this way, spaces can be defined between the inner housing surface, e.g. sections of two inner housing surfaces, and a surface section. An elastic element can be provided in each of the spaces so that a rotation of the swing bar leads to a deformation of the elastic elements. By this, the swing bar can be held in the housing rotatable around a swing axis. Accordingly, the housing is rotatable about the swing axis and consequently the drive track wheel is also rotatable about the swing axis.

According to a further preferable embodiment, the track wheel suspension further comprises a restraining mechanism for at least restraining a movement of the second coupling portion about the swing axis in at least a first direction.

The restraining mechanism for at least restraining a movement of the second coupling portion about the swing axis in at least a first direction can be any suitable mechanism which is able to achieve the desired function. It is to be noted that the term "restraining a movement" in the context of the present invention means that the movement is at least made more difficult compared to a condition in which no restraining takes place. However, "restraining a movement" shall also include a condition in which the movement is fully prevented or blocked. Furthermore, with the mechanism as described, restraining the movement is possible in at least a first direction. This means that depending on the configuration of the mechanism, a movement of the second coupling portion about the swing axis can be restrained in one or both directions. In this connection, a configuration may be realized which allows selective restraining.

With the above configuration of the track wheel suspension, a simple, reliable suspension for a construction machine is achieved with increased adaptability. In other words, the invention is based on the idea that prior art systems are not sufficiently capable to adapt to different conditions, e.g. different driving conditions.

S In a further preferable embodiment, the restraining mechanism is configured to force-transmittingly connect with at least one of one or more restraining portions of the swing bar so that a movement of the at least one of the one or more restraining portions of the swing bar about the swing axis is restrained. In this way, the characteristic of the track wheel suspension can be influenced leading to a more flexible overall system.

In the context of the present application, a restraining portion of the swing bar may be any portion of the swing bar which is configured to receive a force which counteracts a rotational movement of the swing bar. Such a portion may be configured in a specific shape or may comprise means for mounting additional elements like arms etc. non-rotatably on the swing bar. For example, the restraining portion of the swing bar may be embodied as a portion having a square cross section onto which a correspondingly formed link arm having a square opening may be arranged non-rotatably. The restraining portion may also comprise a threaded opening for mounting a link arm or other force application member on the swing bar. Furthermore, it is to be noted that each swing bar can comprise multiple restraining portions which may be similarly or differently configured and may be arranged along the swing bar at equal or different distances.

According to the embodiment, the restraining mechanism is configured to force-transmittingly connect with at least one of the one or more restraining portions of the swing bar. The restraining mechanism may be any mechanism allowing to introduce a force into the one or more restraining portions. In particular, the restraining mechanism may be configured to establish a positive locking or a frictional locking with the swing bar. The restraining mechanism may include but is not limited to clutches, locks etc.

According to a preferable embodiment, the restraining mechanism is configured to releasably lock at least one of the one or more restraining portions of the swing bar into position.

In this way, a movement of the swing bar at the restraining portion may be temporarily fully blocked such that the restraining portion cannot move at all. That is, the restraining mechanism is configured to selectively allow or restrict a movement of the swing bar at the restraining portion. If a restraining portion of the restraining portions is locked into position, the swing bar is fixedly and non-rotatably held at this restraining portion. Depending on the location of the restraining portion in the longitudinal direction of the swing bar, the swing bar may be able to twist and to still provide a certain degree of resiliency so that the swing device may still be able to rotate about the swing bar axis but with a more limited extent. In other words, a portion of the swing bar between the restraining portion and the swing device may act as a torsion spring. In case the restraining mechanism is configured to be able to releasably lock one or more restraining portions, the track wheel suspension may be configured to allow a selective restriction at different axial positions of the swing bar. In this way, the spring stiffness of the swing bar can be adjusted to different situations or driving conditions. In order to increase the spring stiffness, the restraining mechanism can releasably lock the swing bar at a restraining portion which is located adjacent to the swing device whereas a lower spring stiffness is achieved in case the restraining mechanism releasably locks a restraining portion which is located at a greater distance away from the swing device.

According to a preferable embodiment, the restraining mechanism comprises an engaging member configured to directly or indirectly establish a form-fit coupling with at least one of the one or more restraining portions of the swing bar. In other words, the restraining mechanism may selectively provide a positive fit connection with the swing bar at the restraining portions of the swing bar. The engaging member can be a hook-like member which is able to engage with the restraining portion. However, the engaging member may also be a locking rod which is axially movable and able to engage with an opening provided in the restraining portion. The engaging member can get into direct contact with one or more of the one or more restraining portions or can act as an actuation element for moving a further element into contact with the restraining portion in order to restrain the movement of the same. In this way, a simple and reliable restraining mechanism may be achieved.

According to a further preferable embodiment, at least one of the one or more restraining portions comprises an engaging section integrally formed on the swing bar. In this way, a reliable and easy restraining portion can be provided. For example, the engaging section can be provided in the form of a protrusion protruding from an outer circumference of the swing bar. Furthermore, it is possible to provide a recess on the swing bar with which the engaging member may engage.

According to a further preferable embodiment, at least one of the one or more restraining portions comprises an engaging element fixedly coupled to the swing bar. The engaging element may be non-rotatably coupled to the swing bar and may be configured so as to receive a portion of the swing bar. For example, the swing bar may comprise a square cross section and the engaging element may comprise a recess or opening having a corresponding shape. In this way, it is possible to insert the swing bar into the opening or recess in order to provide a form-fit coupling which is able to transfer rotational forces from the swing bar to the engaging element.

According to a further preferable embodiment, one restraining portion of the one or more restraining portions is provided on a second bar end of the swing bar. By providing one restraining portion on the second bar end of the swing bar, a rotation of the second bar end of the swing bar is restrained. In this way, the portion of the swing bar between the second bar end and the swing device may act as a torsion spring. Accordingly, forces resulting from shocks exerted on the swing device are not directly transferred to the restraining portion and consequently dampened to a certain extent before acting on the restraining mechanism. In this way, the load exerted on the restraining mechanism is reduced and it is possible to provide a more lightweight construction.

According to a further preferable embodiment, one restraining portion of the one or more restraining portions is provided on the first bar end of the swing bar. Accordingly, a restraining portion may be provided close to or adjacent the swing device so that no considerable portion of the swing bar is available to act as a torsion spring. In this way, it is possible to lock the movement of the swing device to the greatest extent since the spring stiffness is highest with such a configuration. In this way, a configuration is provided which is able to lock the suspension to the greatest extent.

According to a preferable embodiment, it is possible to at least restrain a movement of the leading or trailing track wheel of the construction machine. In this way, it is possible to prevent undesired movements of the construction machine in certain driving conditions including pitching, for instance.

According to a preferable embodiment, at least a leading track wheel of multiple track wheels for each track is carried by a track wheel suspension as described above.

According to a preferable embodiment, each track wheel of said construction machine is supported by a track wheel suspension as described above.

According to a further preferable embodiment, the construction machine further comprises an actuator for actuating a restricting mechanism, the actuator being preferably manually operable and/or automatically operable by means of a control system.

For example, the actuator may be a hydraulic cylinder coupled to the engaging member of the restraining mechanism. On the other hand, the actuator may be a lever operatively coupled to the engaging member of the restraining mechanism. The hydraulic cylinder may be controlled by means of a control system or may be manually operated by actuation elements. The control system may be configured to actuate one or more automatically operable actuators such as hydraulic cylinders. In this way, it is possible to provide a suspension with great variability. The control system may be coupled to sensors of the construction machine in order to be able to dynamically operate the actuator dependent on certain conditions like acceleration or load acting on the construction machine.

According to a preferable embodiment, the actuator is configured to simultaneously operate each restraining mechanism. With this configuration, a movement of each swing bar can be locked simultaneously in order to provide a fully rigid suspension of the construction machine.

According to a further aspect of the present invention, a construction machine comprising a machine body carried by at least one pair of tracks and a track wheel suspension as described above is provided.

According to an embodiment, the construction machine further comprises a swing movement limiting device for limiting the swing movement of a swing device in at least one direction. Such a configuration provides an enhanced suspension in that an undesired movement of the swing device is limited in at least one direction. In this way, the durability and reliability of the overall track wheel suspension is enhanced as no excessive stress may be applied to the swing bar.

According to an embodiment of the present invention, the swing movement limiting device comprises a contact portion for abutting an abutment portion provided in the track wheel suspension. In this way, a simple and reliable construction of the swing movement limiting device is achieved leading to reduced manufacturing and maintenance costs.

According to a further embodiment of the present invention, the movement limiting device comprises a protrusion protruding from the machine body of the construction machine. Again, a further element of the swing movement limiting device is simply and reliably constructed leading to reduced manufacturing and maintenance costs.

Additional features and advantages may be gleaned by the person skilled in the art from the following description of exemplary embodiments, which are not to be construed as limiting, however, drawing reference to the attached drawings.

BRIEF DESCRIPTION OF THE DRAWINGS

The present invention will hereinafter be described in conjunction with the following drawing figures, wherein like numerals denote like elements, and.

All figures are only schematic depictions of exemplary embodiments in which, in particular, distances and dimensional correlations are not presented to scale.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
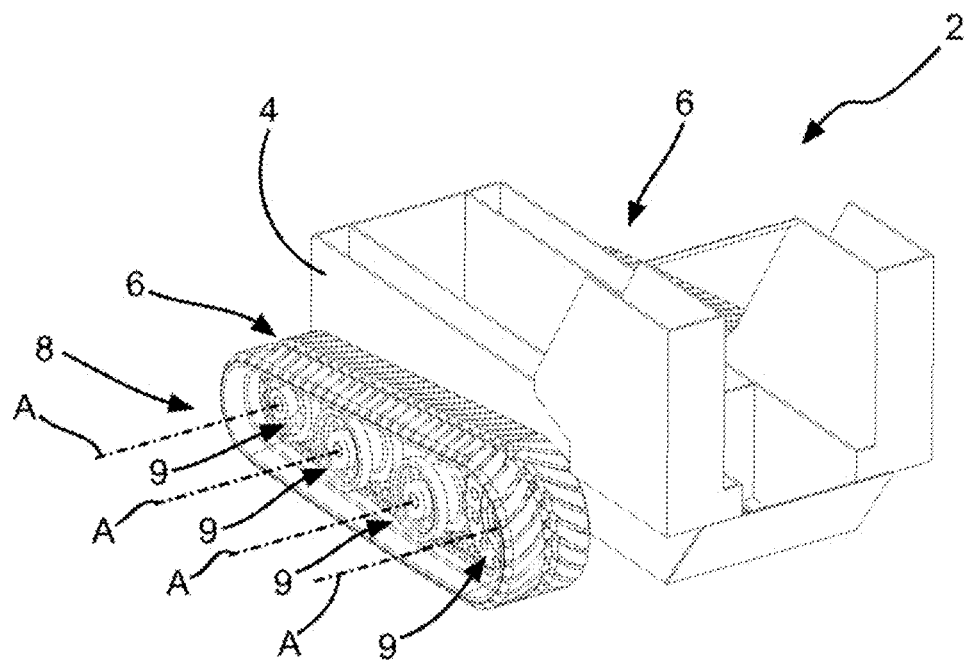
FIG. 1 shows a perspective view of a construction machine comprising a track wheel suspension according to an exemplary embodiment.
Figure 2:
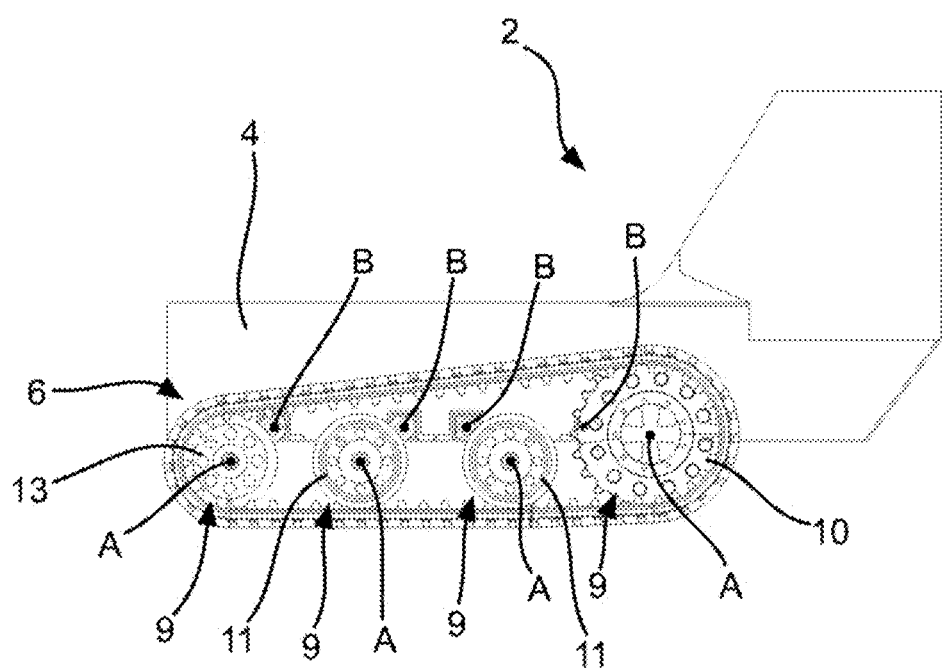
FIG. 2 shows a side view of the construction machine of FIG. 1.

FIG. 1 shows a perspective view of a construction machine 2 comprising a track wheel suspension 8 according to an exemplary embodiment. The construction machine 2 comprises a machine body 4 which is carried by two tracks 6. The tracks 6 are supported by the track wheel suspension 8 which is in turn coupled to the machine body 4. The view as shown in FIG. 1 shows the construction machine from behind and oblique to its longitudinal direction. FIG. 2 shows a side view of the construction machine 2 shown in FIG. 1.

Each of the tracks 6 are guided by track wheels 9. In the embodiment, the track wheels 9 include a drive track wheel 10, two support wheels it and an idler wheel 13. All track wheels 9 are supported rotatable about axes A and are spaced with respect to each other in the longitudinal direction of the construction machine 2.

Figure 3:
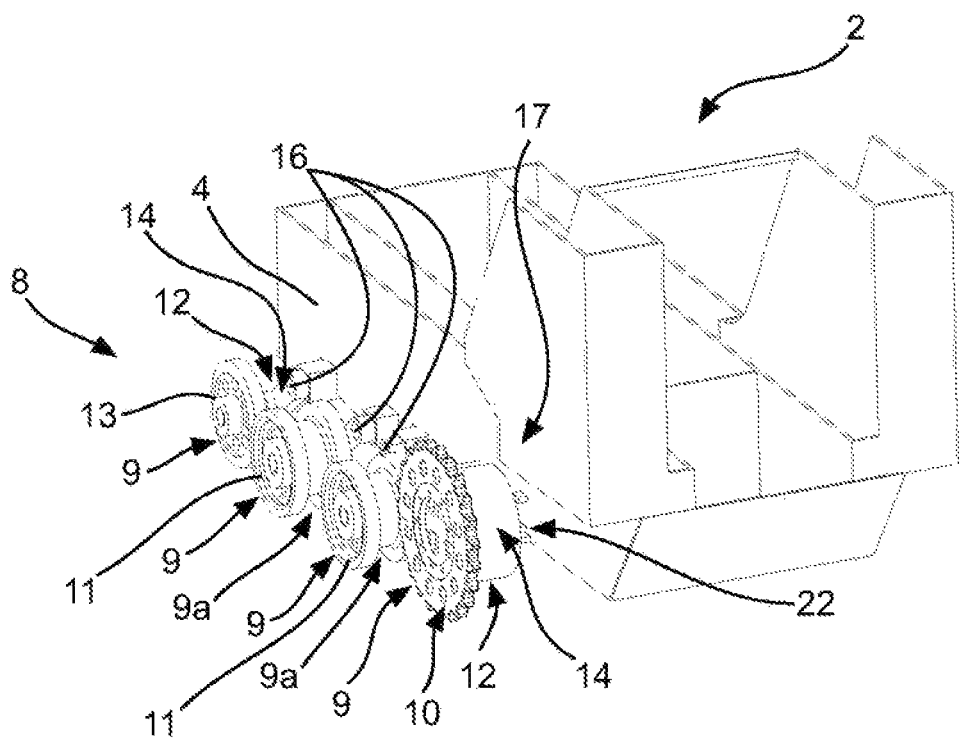
FIG. 3 shows a perspective view of the construction machine of FIG. 1 depicting components of a track drive of the construction machine.
Figure 4:
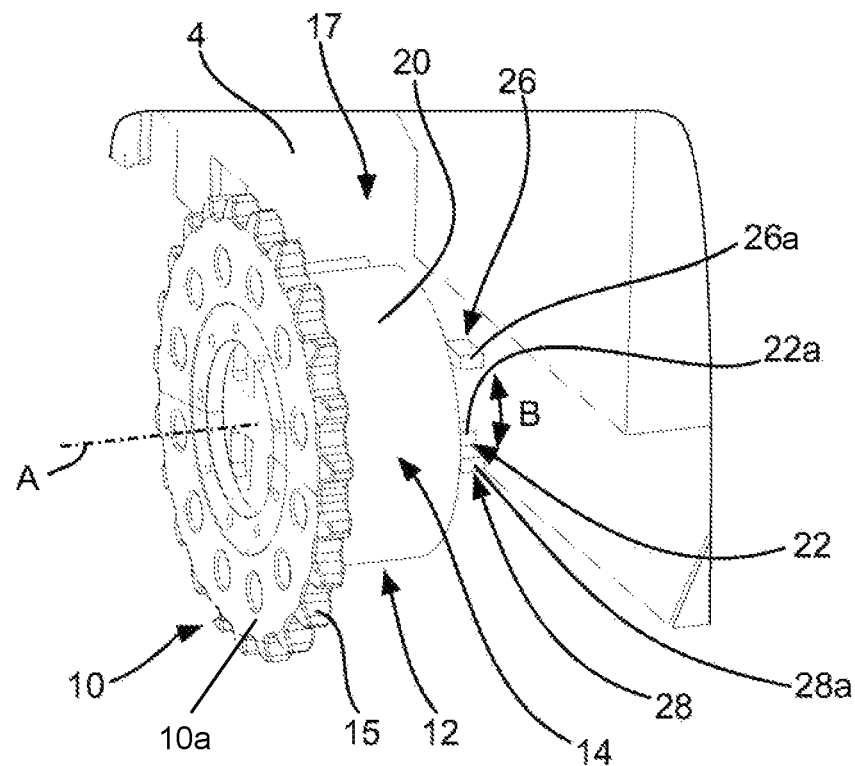
FIG. 4 shows an enlarged view of a drive track wheel of a track wheel suspension according to an exemplary embodiment.

In FIG. 3, the construction machine 2 according to the embodiment is shown in a similar view to the one shown in FIG. 1 wherein the track 6 is omitted in order to show the construction of the track wheel suspension 8 in greater detail. FIG. 4 is an enlarged view of the trailing track wheel 9 of the construction machine shown in FIG. 3.

As can be gathered from FIGS. 3 and 4, the trailing track wheel 9 is a drive track wheel 10 comprising a sprocket 10a having teeth 15 adapted to engage with a track 6. The drive track wheel 10 comprises a direct drive 17 for driving the drive track wheel 10. In the present embodiment, the direct drive 17 comprises a hydraulic motor (not shown) coupled to a multi-stage planetary gear set (also not shown). The hydraulic motor and the planetary gear set are both accommodated in a housing 20 of the direct drive 17 and are adapted to generate and apply a rotational force on said drive track wheel 10. The drive track wheel 10 is supported in said housing 20 rotatable about a rotational axis A.

Figure 5:
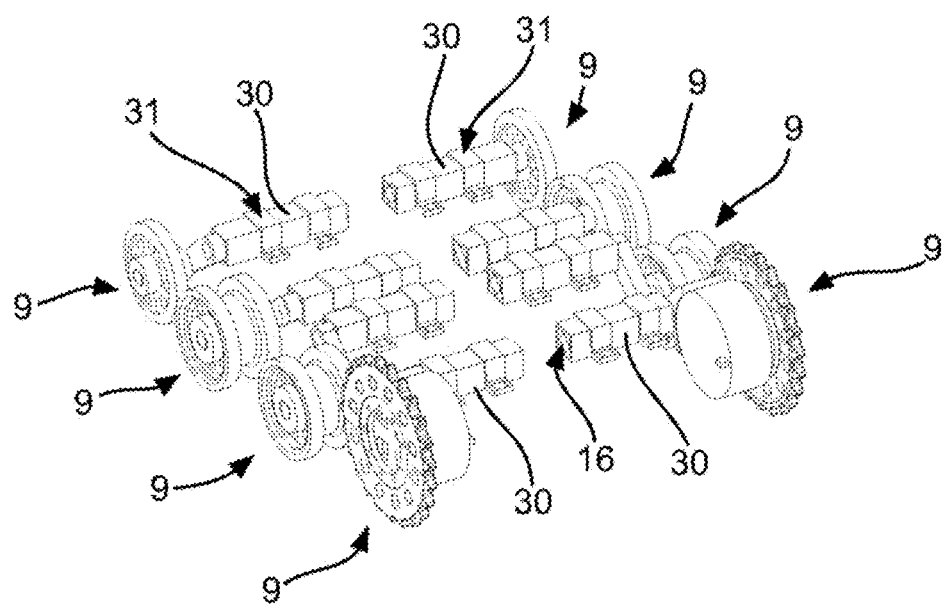
FIG. 5 shows a perspective view of components of a track wheel suspension according to an exemplary embodiment.
Figure 6:
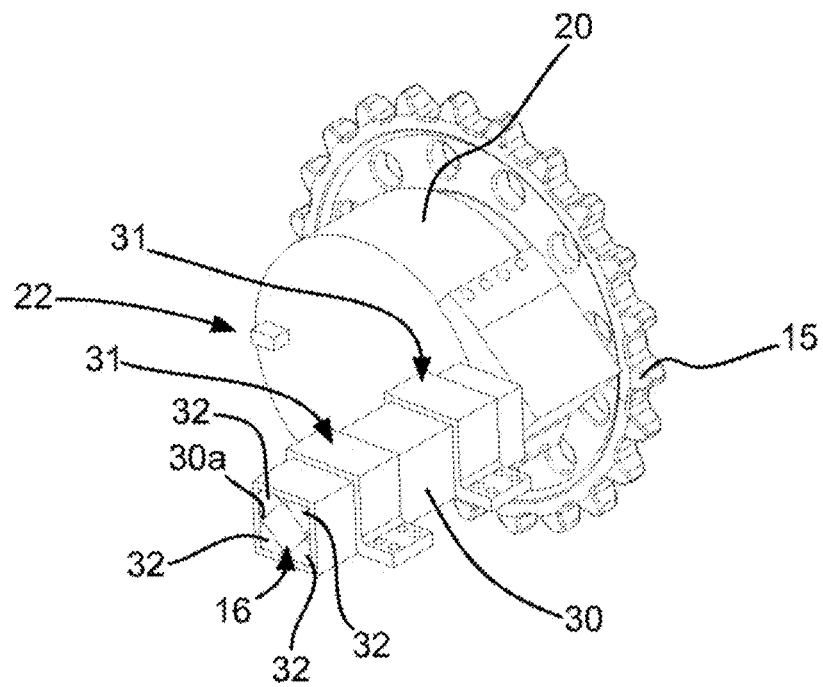
FIG. 6 shows a perspective view of a drive track wheel suspension according to an exemplary embodiment.
Figure 7:
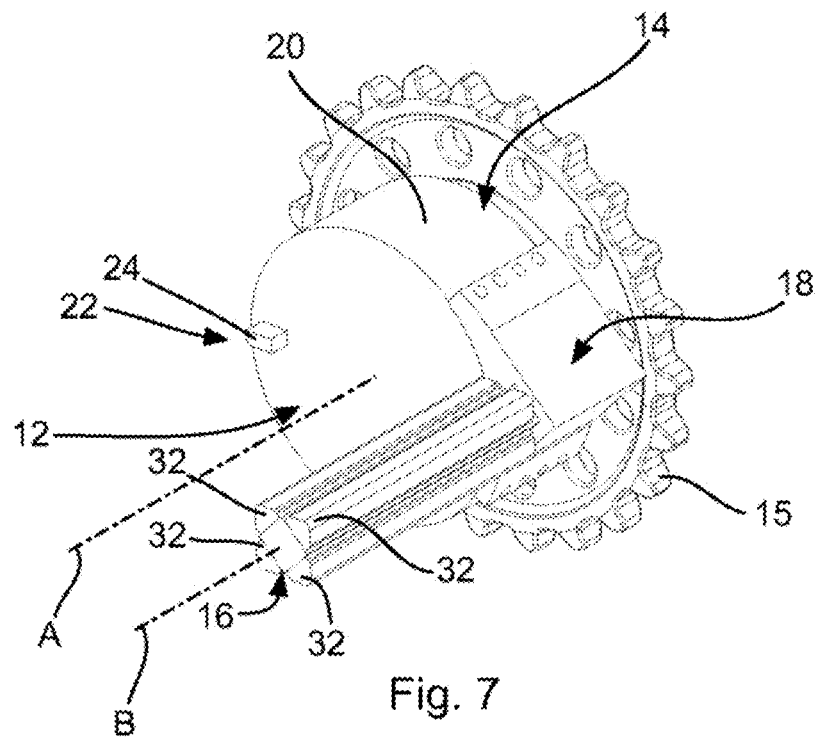
FIGS. 7 and 8 show detailed views of the drive track wheel suspension of FIG. 6.
Figure 8:
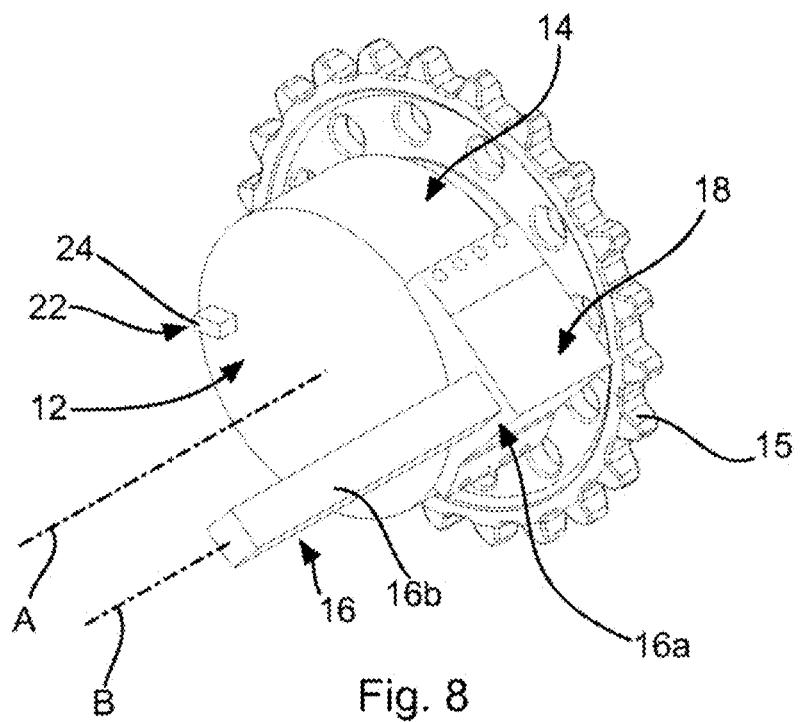

The housing 20 and, consequently, the drive track wheel 10 are supported rotatably about a swing axis B. Thus, the housing 20 forms a part of a swing device 12 in the sense of the present invention. The components providing the swing axis B and the construction of the track wheel suspension 8 will be described with respect to FIGS. 6 to 8 in greater detail. Furthermore, a perspective view of the track wheel suspension without tracks and the machine body 4 is shown in FIG. 5. FIGS. 6 to 8 show perspective views of a track wheel suspension 8 of the drive track wheel 10.

As already mentioned, the drive track wheel 10 is rotatably coupled to the housing 20. The housing 20 is non-rotatably coupled to a first bar end 16a of a swing bar 16 at a second coupling portion 18. For that purpose, the swing bar end 16a is coupled to the outer periphery of the housing 20 by means of the second coupling portion 18. The swing bar 16 is rotatably held in a swing bar housing 30 which is mounted to the machine body 20 by means of brackets 31.

In the present embodiment, the swing bar 16 as well as the swing bar housing 30 comprise a square shape. However, different shapes could be used instead. A maximum diameter of the swing bar 16, that is the distance between two diagonally opposite edges, is smaller than the distance between two inner housing surfaces 30a of the swing bar housing 30 which face each other. The swing bar 16 comprises four surface section 16a. In FIG. 6, the swing bar 16 is in a position in which it is rotated in the swing bar housing 30 such that the surface sections 16a face towards the edges of the swing bar housing 30. In other words, the surface sections 16a are arranged inclined to inner housing surfaces 30a at an angle of about 45°. In this way, triangular spaces are defined between sections of two inner housing surfaces 30 and a surface section 16a. An elastic element 32 is provided in each of the triangular spaces so that a rotation of the swing bar 16 leads to a deformation of the elastic elements 32. By this, the swing bar 16 is held in the housing 30 rotatable around a swing axis B. Accordingly, the housing 20 is rotatable about the swing axis B and consequently the drive track wheel 10 is also rotatable about the swing axis B.

Although not shown in the drawings, the swing bar 16 and the elastic elements 32 are encapsulated in the swing bar housing 30. In the present embodiment, a seal (not shown) is provided for sealing the space between the end portion of said swing bar housing 30 and the swing bar 16. In this way, foreign matter is prevented from entering the interior of the swing bar housing 30.

As can be seen in FIG. 2, the rotation axes A of the track wheels 9 are arranged differently with respect to the swing axes B. More precisely, the rotation axes A of the rear two track wheels g are arranged longitudinally behind their swing axes B and the rotation axes A of the front two track wheels 9 are arranged longitudinally in front of their swing axes B. Due to this construction, the back of the machine body 4 of the construction machine 2 tends to lift or "jack" in case a forward moment is generated on the machine body. For example, when the construction machine is a compact loader, such a moment can be generated when a bucket of the loader is filled. On the other hand, if a moment in the opposite direction is generated, the back of the construction machine will be lowered or "squat".

In order to limit the latter described movements, i.e. "jacking" and "squatting" of the back of the construction machine, the track wheel suspension according to the present embodiment further comprises a swing limiting device 22 for restricting a swing movement of the swing device 12. In the present embodiment, the swing limiting device 22 restricts a movement of the housing 20 with respect to the machine body 4 by interacting with features provided on the machine body 4. More precisely, the swing limiting device 22 comprises an abutment portion 24 on the housing 20. This abutment portion 24 is configured to abut a contact portion 26, 28 provided on the construction machine 2. In the present embodiment, two contact portions 26, 28 are provided, each of them being provided for limiting the swing movement of the housing 20 in one direction.

As is shown in FIG. 4, the housing 20 is rotatable about the swing axis B in a direction indicated by arrow B. The abutment portion 24 is provided on the housing 20 in the form of a protrusion 24b that protrudes from the housing 20 in the direction of machine body 4. On the machine body 4, two protrusions 26a, 28a are provided forming the contact portions 26, 28 and protruding towards the housing 20.

The protrusion 22a is provided on the housing 20 on an opposite side of the second coupling portion 18 as can be gathered from FIG. 8, for instance. Accordingly, the distance between the swing axis B and the rotation axis A is smaller than the distance between the swing axis B and the protrusion 22a. Furthermore, the protrusion 22a is at least partially provided between the protrusions 26a, 28a such that it may contact the contact portions 26, 28. The contact portions 26, 28 are arranged on the machine body 4 on a movement path of the protrusion 22a and consequently limit the movement of the protrusion 22a. It is to be noted that an inverse arrangement would also be possible. In such an inverse arrangement, the configuration of the protrusions could be inverted meaning that two protrusions could be provided on the housing and one protrusion could be provided on the machine body. The function would be the same.

In the present embodiment, a fixed configuration is shown in which the protrusions are fixedly attached on the respective components. However, it is possible to use swing limiting device which provides a variable swing movement. In other words, it is possible to implement a mechanism which allows to change the maximum swing movement of the housing. This could either be accomplished by a mechanism which actively changes the positions of the protrusions, in particular of the contact portions 26, 28 along a movement path of the protrusion 22a, or by a mechanism in which the movement path of the protrusion 22a can be varied. For example, the protrusion 22a may be provided movable in the radial direction of the housing 20 towards and away from the rotation axis A or towards and away from the swing axis B. In either way, the path on which the protrusion 22a moves about the swing axis B is changed. With such a configuration, it is possible to provide different contact portions for different movement paths of the protrusion 22a. Such a mechanism could be controlled or feedback-controlled such that different movement paths of the protrusion 22a are set for different uses of the construction machine.

Figure 9:
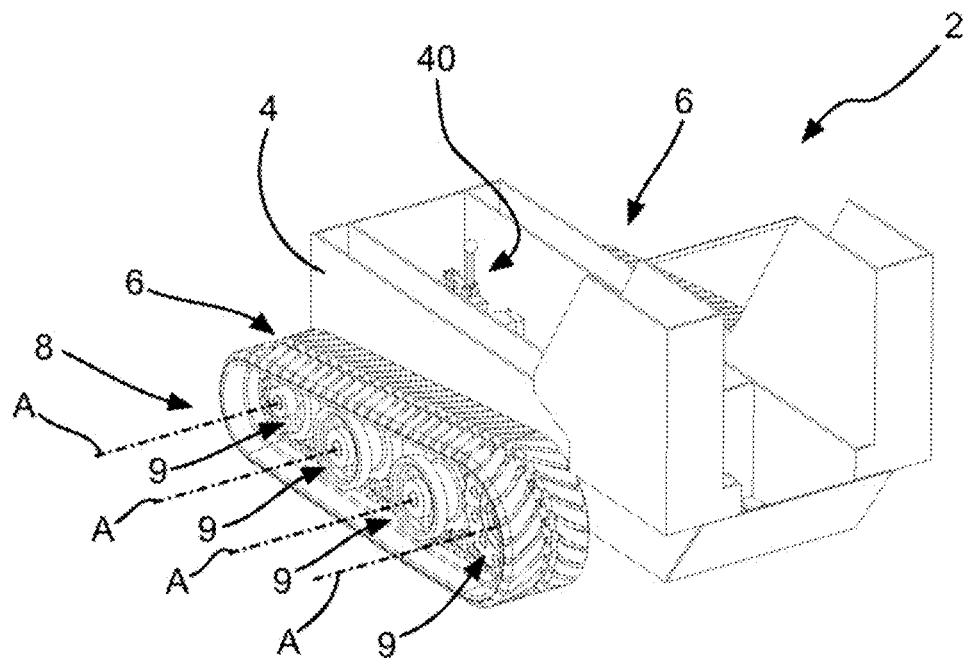
FIG. 9 shows a perspective view of a construction machine comprising a track wheel suspension according to a further exemplary embodiment.
Figure 10:
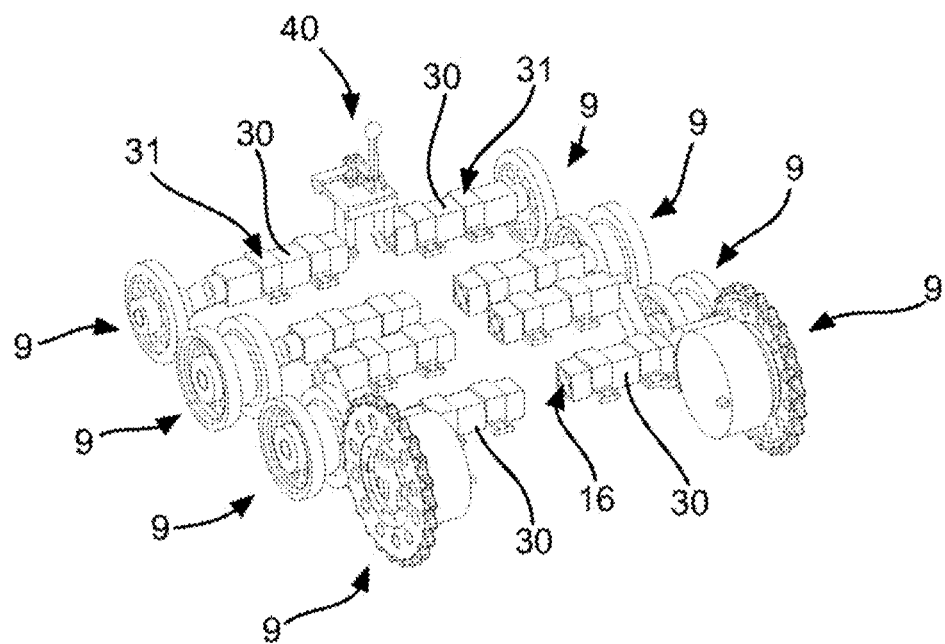
FIG. 10 shows a perspective view of the construction machine of FIG. 9 depicting components of a track drive of the construction machine.

FIG. 9 shows an alternative configuration of a construction machine 2 comprising a track wheel suspension 8 according to an exemplary embodiment. Like the construction machine 2 shown in FIG. 1, the construction machine 2 as shown in FIG. 9 also comprises a machine body 4 which is carried by two tracks 6 and has an overall similar construction. The tracks 6 are again supported by track wheel suspension 8 which is coupled to the machine body 4. In addition to the configuration shown in FIG. 1, track wheel suspension 8 comprises a restraining mechanism 40 for restraining a movement of a track wheel 9 about the swing axis B. It is to be noted that the alternative configuration can also be implemented without the swing limiting device as described above and with a different construction of the suspension supporting the drive track wheel 10.

In the embodiment as shown in FIG. 9, the restraining mechanism 40 is configured to restrain the movement of the leading track wheel 9 in the upward direction. However, the same or a similar mechanism may be applied for restraining other track wheels of the construction machine. The construction of the track wheel suspension including the restraining mechanism will be described in the following with reference to FIGS. 10 to 14.

Figure 13:
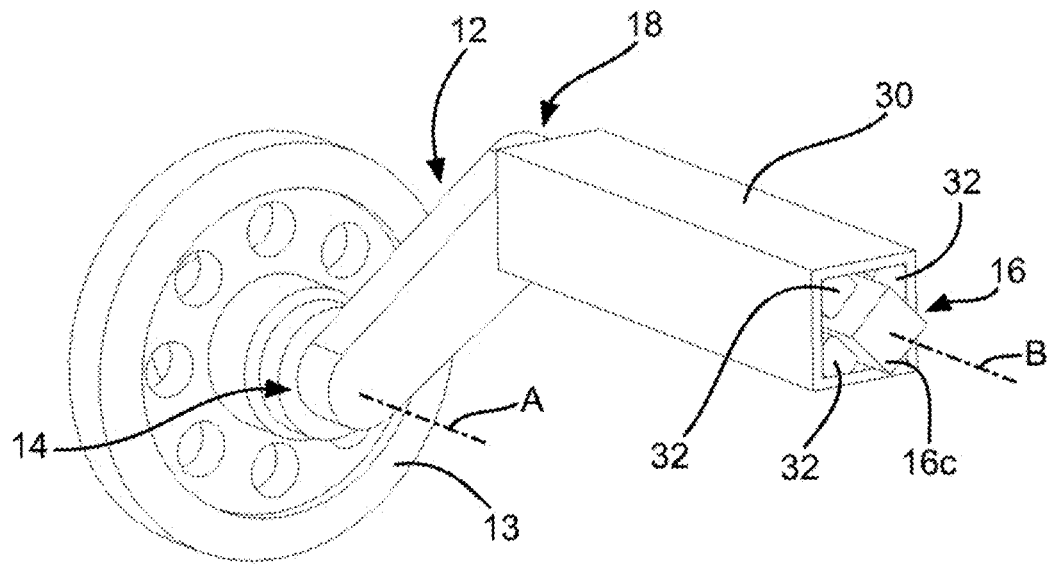
FIGS. 13 and 14 show perspective views of components of the idler wheel suspension according to an exemplary embodiment.
Figure 14:
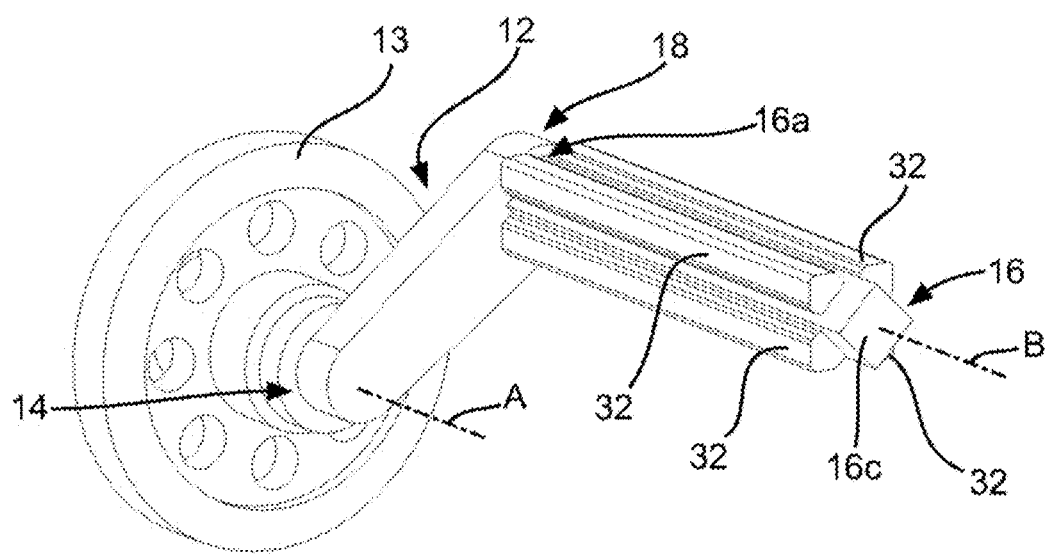

As is shown in FIGS. 13 and 14, the leading track wheel, an idler wheel 13 in the present embodiment, is supported in a partially similar way as the drive track wheel 10 shown in FIGS. 6 and 7. Again, the swing bar 16 is housed in swing bar housing 30 such that in an unloaded state as shown in FIGS. 13 and 14, the surface sections 16a are arranged inclined to inner housing surfaces 30a at an angle of about 45°. In each of the triangular spaces defined between sections of two inner housing surfaces 30 and a surface section 16a, an elastic element 32 is provided so that a rotation of the swing bar 16 leads to a deformation of the elastic elements 32 generating a counter force against the movement.

The swing bar 16, more precisely the first bar end 16a of the swing bar 16, is coupled to swing device 12 at the second coupling portion 18 of the swing device 12. The swing device 12 is embodied as a swing arm in FIGS. 11-14. In contrast to the configuration as shown in FIGS. 5-7, a second bar end 16c of the swing bar 16 on the opposite side of the first bar end 16a protrudes from the swing bar housing 30 according to the configuration of the present embodiment. In other words, the second swing bar end 16c is provided exposed such that an engagement with the same is possible.

An engaging element 44 is coupled to the swing bar end 16c so as to rotate integrally with the same. The engaging element 44 and the second swing bar end 16c together form a restraining portion 16r1. However, it is to be noted that the swing bar 16 may be specifically configured such that a direct engagement with the same is possible instead of using an engaging element as described here.

The engaging element 44 comprises a coupling portion 44a and an abutment portion 44b. The coupling portion 44a is formed with an opening having a mating shape to the shape of the swing bar 16 which is a square shape in the present embodiment. The coupling portion 44a may comprise a dimension such that it may be coupled to the swing bar end 16c by press fitting. However, different configurations are possible. For example, the engaging element can be coupled to the swing bar 16 by bonding or can even be integrally formed with the swing bar 16.

Figure 11:
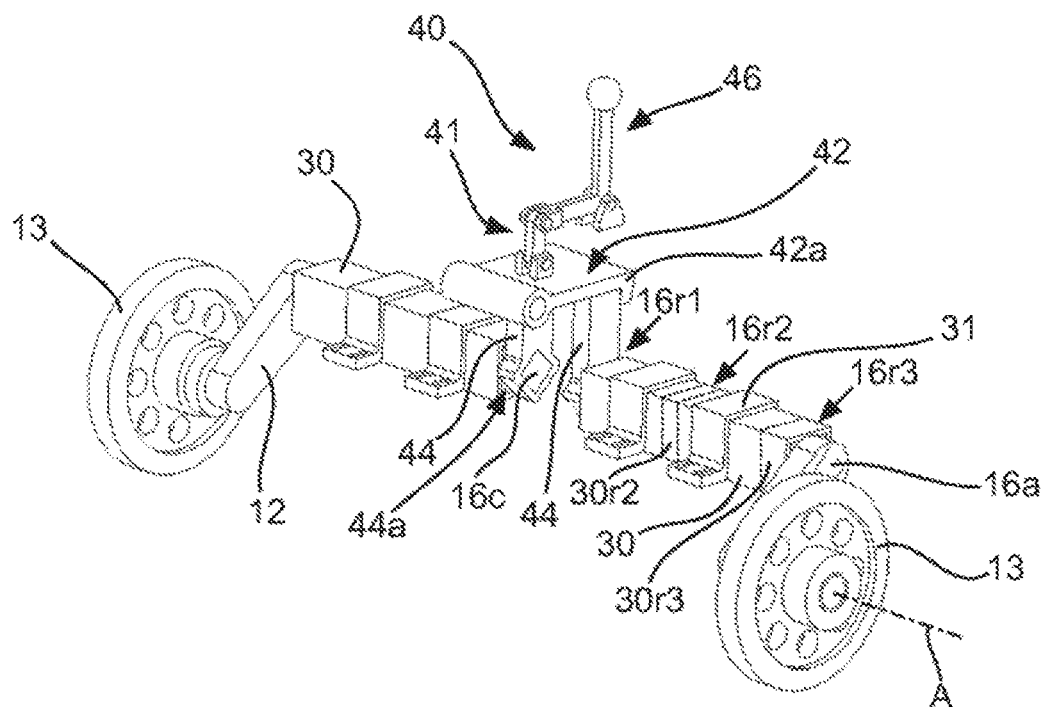
FIG. 11 shows a perspective view of an idler wheel suspension comprising a restraining mechanism according to an embodiment.
Figure 12:
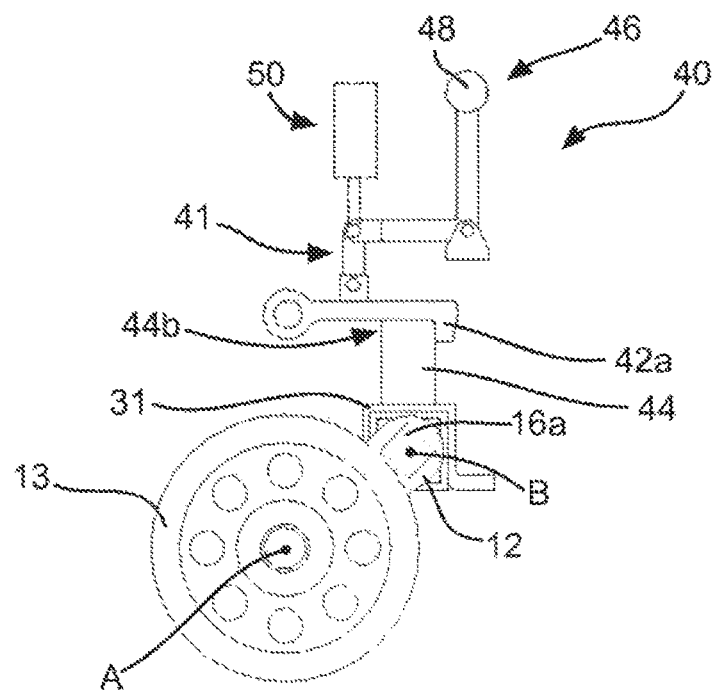
FIG. 12 shows a side view of the idler wheel suspension of FIG. 11.

The abutment portion 44b protrudes from the coupling portion 44a in a substantially radial direction of the swing axis B and is adapted to engage with further elements of the restraining mechanism 40. As is best shown in FIGS. 11 and 12, the restraining mechanism 40 comprises an actuator which is embodied as a lever 48 and an engaging member 42 operatively coupled to the lever 48 by means of a link mechanism 41. The engaging member 42 is rotatably supported and comprises a hook-like structure having a contact section 42a adapted to contact the abutment portion 44b on one side. As the engaging member 42 is operatively coupled to the lever 48, an operation of the lever leads to a movement of the engaging member 42. Thus, by operating the lever 48, the engaging member 42 is operated.

As shown in FIG. 12, a hydraulic cylinder 50 may be provided in addition or alternatively to the lever 48. Using a hydraulic cylinder has the benefit that the actuation of the engaging member 42 can be automated in case the hydraulic cylinder 50 is connected to a suitable control system. For example, such a control system may comprise different sensors like acceleration sensors or load sensors measuring the loads acting on the track wheels and may be configured to operate the hydraulic cylinders 50 selectively and depending on information determined by the sensors. Furthermore, it is possible to provide an actuation of the hydraulic cylinders depending on different expected use scenarios of the construction machine. For example, in case the construction machine is a compact track loader, it could be implemented that the engaging member 42 is engaged as soon as a predetermined condition is met like reaching a specific bucket position which signalizes that a bucket loading action is imminent, for instance.

In FIG. 12, the engaging member 42 is shown in a condition in which it is engaged with the abutment portion 44b of the engaging element 44 such that a rotation of the engaging element 44 and thus of the swing bar 16 at the restraining portion 16r1 in the clockwise direction is prevented. Consequently, in the state as shown in FIGS. 11 and 12, a rotation of the swing arm 12 about the swing axis B is restricted. Since the swing arm 16 is fixedly held at the second bar end 16c, the swing arm 16 functions as a torsion spring in which the spring stiffness is determined by the material characteristic of the free portion of the swing bar 16 between the restraining portion 16r1 and the first bar end 16a. Accordingly, in the condition as shown in FIGS. 11 and 12, the spring stiffness of the track wheel suspension is increased compared to a condition in which the engaging member 42 is not engaged with the abutment portion 44b of the engaging element 44.

As is indicated in FIG. 1, multiple restraining portions 16r1, 16r2, 16r3 may be provided. In this case, corresponding cutouts or openings 30r3, 30r2 may be provided in the swing bar housing such that engaging elements can be provided on the swing bar 16. The construction of the restraining mechanisms can be similar to the construction of the restraining mechanism 40 or may be different as long as it is possible to restrain a rotation of the restraining portions.

The track wheel suspension 8 as disclosed herein supports single track wheels independent from each other so that the elements described are provided for each supported track wheel. As is shown in FIGS. 5 and 11, the track wheel suspension is configured symmetrically with respect to the longitudinal axis of the construction machine 2. In other words, the suspensions provided to support the track wheels have the same construction for each track axle.

The track wheel suspension may comprise the restraining mechanism 40 in combination with the construction of the drive track wheel and swing limiting device as described above. However, each of the described mechanisms may be implemented independent from other mechanisms like the swing limiting device described above. When implementing the restraining mechanism, the drive track wheel does not have to be driven by a direct drive and does not have to be constructed in the above described way. However, a construction machine implementing all of the above described techniques and mechanisms is beneficial.

In conclusion, it is pointed out that terms like "comprising" or the like are not intended to rule out the provision of additional elements or steps. Let it further be noted that "a" or "an" do not preclude a plurality. In addition, features described in conjunction with the different embodiments can be combined with each other however desired. It is also noted that the reference numbers in the claims are not to be construed as limiting the scope of the claims. Moreover, while at least one exemplary embodiment has been presented in the foregoing summary and detailed description, it should be appreciated that a vast number of variations exist.

It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A construction machine comprising:
   a track wheel suspension including a track wheel configured and arranged to be engageable to a track,
   a swing device comprising:
      a housing;
      a first coupling portion; and
      a second coupling portion, the first coupling portion provided on the housing and being arranged for rotatably supporting the track wheel, and the second coupling portion in contact with the housing,
   a swing bar comprising a first bar end, the first bar end configured and arranged to be mounted to the second coupling portion of the swing device, and the swing bar providing a swing axis, and
   a swing limiting device configured and arranged for restricting the swing movement of the swing device, the swing limiting device comprising an abutment portion provided on the housing, the abutment portion being configured and arranged to abut a contact portion on the construction machine, and the abutment portion being configured and arranged opposite to the second coupling portion with respect to a rotation axis,
   wherein the swing axis is offset from the rotation axis of the track wheel such that a swing movement of the swing device enables a movement of the track wheel in a direction which is substantially perpendicular to the rotation axis, and
   wherein each track wheel of the construction machine is supported by such a track wheel suspension.

2. The construction machine according to claim 1, wherein the track wheel is a drive track wheel leading or trailing track wheel of multiple track wheels of a construction machine.

3. The construction machine according to claim 1, further comprising a direct drive for driving the track wheel.

4. The construction machine according to claim 3, wherein the direct drive comprises a wheel hub drive mounted to the track wheel.

5. The construction machine according to claim 1, further comprising a swing bar housing configured and arranged to accommodate and rotatably support the swing bar, wherein at least one elastic element is positioned between an outer bar surface of the swing bar and an inner housing surf ace of the swing bar housing.

6. The construction machine according to claim 5, wherein the swing bar and at least one elastic element are encapsulated in the swing bar housing, and wherein a seal is provided that is configured and arranged to seal a space between an end portion of the swing bar housing and the swing bar.

7. The construction machine according to claim 5, wherein the swing bar comprises four peripheral surface sections and four elastic elements, each elastic element being located between a respective peripheral surface section and the inner housing surface.

8. The construction machine according to claim 1, comprising:
   a machine body carried by at least one pair of tracks.

9. The construction machine according to claim 8, further comprising:
   a swing movement limiting device configured and arranged to limit the swing movement of the swing device in at least one direction.

10. The construction machine according to claim 9, wherein the swing movement limiting device comprises a contact portion configured and arranged to abut an abutment portion provided in the track wheel suspension.

11. The construction machine according to claim 10, wherein the swing movement limiting device comprises a protrusion, the protrusion protruding from the machine body of the construction machine.

12. A construction machine comprising:
   a track wheel suspension including a track wheel configured and arranged to be engageable to a track,
   a swing device comprising a first coupling portion and a second coupling portion, the first coupling portion being arranged for rotatably supporting the track wheel,
   a swing bar comprising a first bar end, the first bar end configured and arranged to be mounted to the second coupling portion of the swing device, and the swing bar providing a swing axis, and
   a swing limiting device configured and arranged for restricting the swing movement of the swing device, the swing limiting device configured and arranged to provide a variable swing movement,
   wherein the swing axis is offset from a rotation axis of the track wheel such that a swing movement of the swing device enables a movement of the track wheel in a direction which is substantially perpendicular to the rotation axis, and
   wherein each track wheel of the construction machine is supported by such a track wheel suspension.

13. The construction machine according to claim 12, further comprising:
   a direct drive for driving the track wheel.

14. The construction machine according to claim 13, wherein the swing device comprises a housing of the direct drive.

15. The construction machine according to claim 12, wherein the swing limiting device comprises an abutment portion provided on the first coupling portion and being configured and arranged to abut a contact portion provided on the construction machine.

16. The construction machine according to claim 15, wherein the abutment portion is configured and arranged opposite to the second coupling portion with respect to the rotation axis.

17. The construction machine according to claim 12, further comprising:
- a swing bar housing configured and arranged to accommodate and rotatably support the swing bar, and
- at least one elastic element, wherein the at least one elastic element is positioned between an outer bar surface of the swing bar and an inner housing surface of the swing bar housing.

18. The construction machine according to claim 17, wherein the swing bar and the at least one elastic element are encapsulated in the swing bar housing, and wherein a seal is provided that is configured and arranged to seal a space between an end portion of the swing bar housing and the swing bar.

19. The construction machine according to claim 17, wherein the swing bar comprises four peripheral surface sections and four elastic elements, each elastic element being located between a respective peripheral surface section and the inner housing surface.

20. The construction machine according to claim 12, wherein the swing limiting device comprises:
- a controllable mechanism configured to provide a variable swing movement.

* * * * *